US009921555B2

(12) United States Patent
Kawamori et al.

(10) Patent No.: US 9,921,555 B2
(45) Date of Patent: Mar. 20, 2018

(54) DEVICE CONTROL SYSTEM, HOST DEVICE, AND CONTROL METHOD OF A HOST DEVICE

(71) Applicant: Seiko Epson Corporation, Tokyo (JP)

(72) Inventors: Takashi Kawamori, Shiojiri (JP); Sadaaki Horiuchi, Okaya (JP); Ryu Kamei, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 678 days.

(21) Appl. No.: 14/091,747

(22) Filed: Nov. 27, 2013

(65) Prior Publication Data

US 2014/0148926 A1     May 29, 2014

(30) Foreign Application Priority Data

Nov. 28, 2012  (JP) .................................. 2012-259927

(51) Int. Cl.
  *G06F 13/40*   (2006.01)
  *G05B 15/02*   (2006.01)
  *G06F 13/42*   (2006.01)
  *G06F 13/38*   (2006.01)

(52) U.S. Cl.
  CPC ........... *G05B 15/02* (2013.01); *G06F 13/409* (2013.01); *G06F 13/4295* (2013.01); *G06F 13/382* (2013.01); *G06F 13/4027* (2013.01); *G06F 13/4045* (2013.01); *G06F 13/4282* (2013.01)

(58) Field of Classification Search
  CPC ........... G06F 2213/4002; G06F 13/385; G06F 13/4226; G06F 13/409; G06F 13/4295; G06F 13/4045; G06F 13/4027; G06F 13/4282; G06F 13/382

See application file for complete search history.

(56) References Cited

U.S. PATENT DOCUMENTS

| 2008/0104305 | A1  | 5/2008  | Ichikawa et al. |
| 2011/0016253 | A1* | 1/2011  | Kakish .................. G06F 13/385 710/313 |
| 2011/0208892 | A1* | 8/2011  | Meyers ............... G06F 13/4226 710/313 |
| 2012/0179804 | A1  | 7/2012  | Katano et al. |
| 2012/0233373 | A1  | 9/2012  | Ohashi |
| 2013/0304961 | A1* | 11/2013 | Lin ....................... G06F 13/409 710/313 |

FOREIGN PATENT DOCUMENTS

| JP | 2011-065551 A | 3/2011 |
| JP | 2012-058887 A | 3/2012 |
| JP | 2012-190347 A | 10/2012 |
| JP | 2012-198981 A | 10/2012 |
| WO | 2011/099144 A1 | 8/2011 |

* cited by examiner

*Primary Examiner* — Ernest Unelus
(74) *Attorney, Agent, or Firm* — Nutter McClennen & Fish LLP; John J. Penny, Jr.

(57) ABSTRACT

Devices can be controlled by group even when multiple devices compatible with different interface standards are connected. An iProduct identifier enabling recognition by the host side as interfaces in the same group is set in the USB 2.0 hub and USB 3.0 hub in the same publisher. The host side determines if the hubs belong to the same group based on the iProduct identifier, and coordinates operation of the USB devices to connected to the USB 2.0 hub and USB 3.0 hub determined to be in the same group.

11 Claims, 8 Drawing Sheets

DEVICE CONTROL SYSTEM, HOST DEVICE, AND CONTROL METHOD OF A HOST DEVICE

Priority is claimed under 35 U.S.C. § 119 to Japanese Patent Application No. 2012-259927 filed Nov. 28, 2012, which is hereby incorporated by reference in its entirety.

BACKGROUND

1. Technical Field

The present disclosure relates to a device control system that controls multiple devices through an interface, to a host device, and to a control method of the host device.

2. Related Art

Media processing devices that record data and print on CD, DVD, and other types of optical disc media are one type of a device control system that controls plural devices through an interface device. See, for example, JP-A-2012-198981.

The media processing device disclosed in JP-A-2012-198981 has a disc publisher (media publishing device) housed in the same case as plural USB (Universal Serial Bus) devices, such as drives and printers for recording data and printing, a USB hub (an interface device) to which the USB devices are connected, and a host device connected through a USB connection to the publisher. The host is able to record data and print on the media by coordinating operation of the USB devices in the publisher.

Whether a single publisher is connected to the host or plural publishers are connected to the host, the host can recognize all devices in each publisher through a single type of interface, and can group the devices by publisher and separately control the operation of each device group, because the plural devices in each publisher in this conventional configuration all use the same interface standard. For example, if all devices use the USB 2.0 standard, all devices are connected to the USB 2.0 hub of the host. By grouping devices by USB bus for group control, the host can coordinate operation of the USB devices in each publisher to record data and print on the media.

However, computers and other electronic devices increasingly use the USB 3.0 standard, which is capable of higher data communication rates. Because the USB 3.0 standard is backward compatible, both USB 2.0 devices and USB 3.0 devices can be connected by providing the host with a USB hub compatible with the USB 3.0 standard (a USB 3.0 hub).

The host, however, recognizes the USB 3.0 hub as different interfaces when the USB 3.0 hub functions as a USB 2.0 hub and when the USB 3.0 hub functions as a USB 3.0 hub. For example, when both USB 2.0 devices and USB 3.0 devices are connected to the USB 3.0 hub, the USB hub is recognized by the host as logically different hubs (a USB 2.0 hub and a USB 3.0 hub). In this event, a USB 2.0 device is recognized through the USB 2.0 hub, and a USB 3.0 device is recognized through the USB 3.0 hub.

As a result, because the host recognizes the devices according to the hub, devices in the same publisher are recognized and grouped by hub, and group control of the devices by publisher unit becomes difficult. When devices compatible with different interface standards are connected to the host, grouping and controlling the devices desirably by group is therefore difficult.

SUMMARY

A device control system, a host device, and a control method of the host device according to at least one embodiment enables desirably grouping and controlling devices by group even when plural devices compatible with different interfaces are connected.

One aspect of at least one embodiment is a device control system including an interface to which a plurality of devices connect, and a control unit that connects and communicates with the plural devices through the interface. The interface is an interface that is compatible with a plurality of interface standards, and is recognized as a plurality of interfaces by the control unit when a plurality of devices of different interface standards are connected, and identification information enabling recognition by the control unit as interfaces in a same group is set in each of the recognized interfaces. The control unit determines whether or not interfaces are in the same group based on the identification information of the recognized interfaces, and coordinates operation of the plural devices connected to the interfaces in the same group.

When plural devices using different interface standards are connected, this aspect recognizes the devices through the different interfaces, determines groups of devices belonging to the same group based on the identification information of the recognized interfaces, and can desirably control the devices by group.

Preferably, the same identification information is set in each interface in the same group.

This enables easily determining if the interfaces are in the same group.

Further preferably, the interface is a single physical interface to which a plurality of devices physically connect, and is logically recognized as a plurality of interfaces when a plurality of devices of different interface standards are connected.

When plural devices of different interface standards are not connected, devices in the same group can be recognized by interface unit when only one interface is recognized. Therefore, group control by interface unit is possible when plural devices of different interface standards are not connected, and group control can also be desirably maintained when plural devices of different interface standards are connected.

Further preferably, the interface is a USB hub disposed between the control unit and the plural devices.

This aspect enables group control of plural devices connected to a USB hub.

In another aspect of at least one embodiment, a plurality of interface settings that are determined according to the interface standard are set in the interfaces that are recognized, and one of these settings is used as the identification information. When the identification information cannot be acquired, and a plurality of unlogged interfaces of which an interface setting other than the identification information satisfies a particular condition are present, the control unit determines those plural interfaces are in the same group, and coordinates operation of the plural devices connected to the interfaces of the same group.

This aspect enables identifying devices belonging to the same group and applying group control desirably even when the identification information cannot be acquired.

In another aspect of at least one embodiment, the interface setting other than the identification information includes a vendor ID and a product ID; and the control unit limits the discovery range of the interfaces to which the plural devices connect based on the vendor ID and product ID.

This aspect enables efficiently discovering desired interfaces.

Another aspect of at least one embodiment is a host device that connects and communicates with an electronic device having an interface to which a plurality of devices connect, and controls the plural devices of the electronic device through the interface, the host device including a control unit that recognizes the interface as a plurality of interfaces when a plurality of devices of different interface standards are connected to the interface, and when identification information enabling recognition by the control unit as interfaces in a same group is set in each of the recognized interfaces, coordinates operation of the plural devices connected to the interfaces determined to be in the same group based on the identification information.

When plural devices using different interface standards are connected, this aspect recognizes the devices through the different interfaces, determines groups of electronic devices based on the identification information of the recognized interfaces, and can desirably control the devices by group.

Another aspect of at least one embodiment is a control method of a host device that connects and communicates with an electronic device having an interface to which a plurality of devices connect, and controls the plural devices of the electronic device through the interface, the method including: recognizing the interface as a plurality of interfaces when a plurality of devices of different interface standards are connected to the interface; and coordinating operation of the plural devices connected to the interfaces determined to be in the same group based on the identification information when identification information enabling recognition as interfaces in a same group is set in each of the recognized interfaces.

When plural devices using different interface standards are connected, this aspect recognizes the devices through the different interfaces, determines groups of electronic devices based on the identification information of the recognized interfaces, and can desirably control the devices by group.

The disclosure can identify groups of devices belonging to the same group, and desirably control the devices by group.

Other objects and attainments together with a fuller understanding of the disclosure will become apparent and appreciated by referring to the following description and claims taken in conjunction with the accompanying drawings.

DESCRIPTION OF EMBODIMENTS

Preferred embodiments are described below with reference to the accompanying figures.

Embodiment 1

Figure 1:
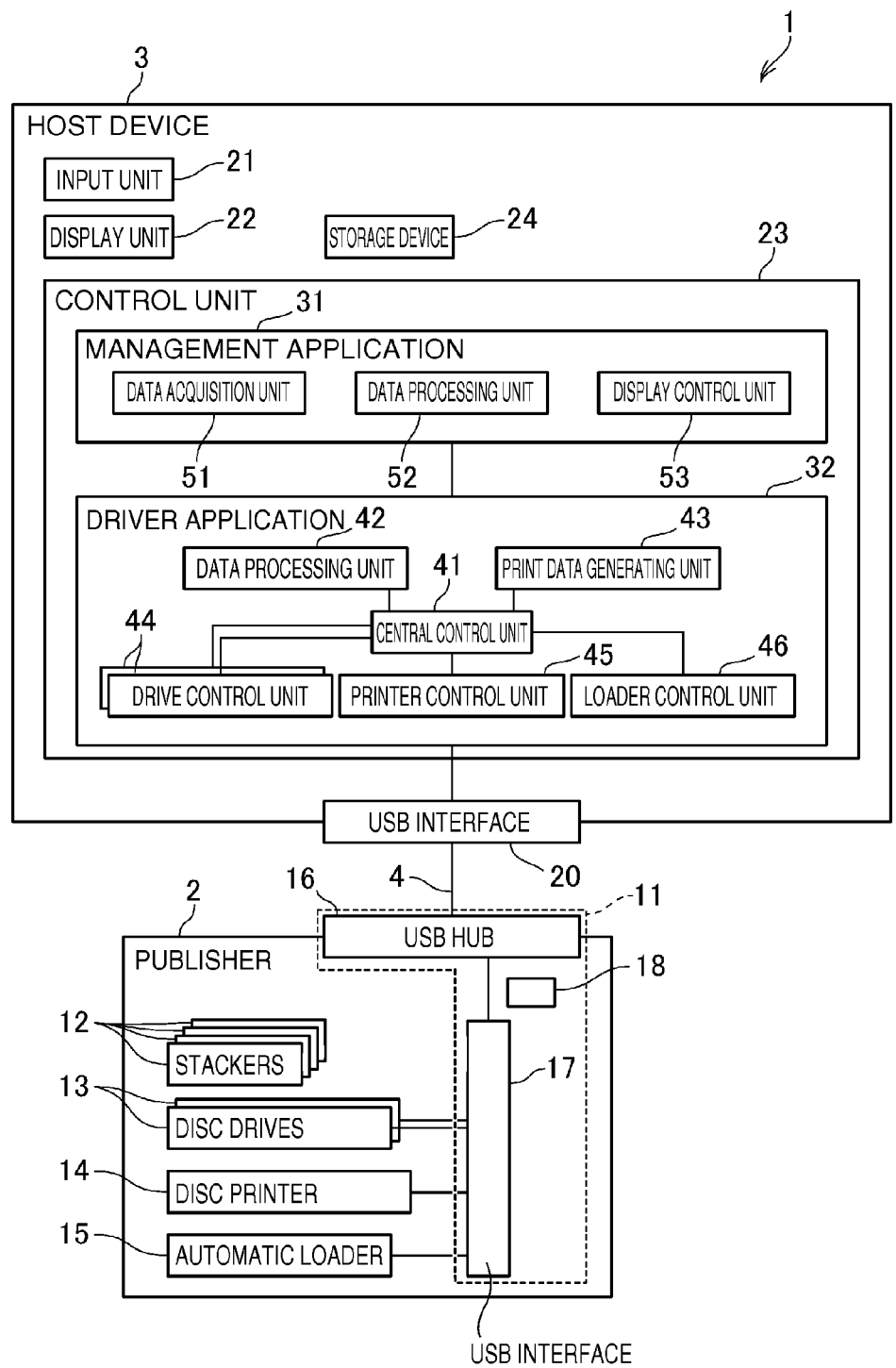
FIG. 1 is a block diagram showing the functional configuration of a media processing system according to a first embodiment.

FIG. 1 shows the functional configuration of a media processing device according to a first embodiment. This media processing device 1 is a system for processing discs (media), and more specifically optical disc media such as CD (Compact Disc), DVD (Digital Versatile Disc), and BD (Blu-ray Disc®) media.

The media processing device 1 has a disc publisher (media publisher) 2, which is a multifunction electronic device that records data and prints on disc media, and a host (control device) 3 that controls the publisher 2, and functions as a device control system in which plural devices in the publisher 2 are controlled by the host 3.

The publisher 2 and host 3 are connected together through a single USB (Universal Serial Bus) cable (communication cable) 4, and communicate data according to the USB standard.

The publisher 2 sequentially processes plural discs according to data (image files, print data, and conveyance control data) sent from the host 3.

More specifically, the publisher 2 has a USB hub 11 for connecting the USB cable 4 that connects to the host 3; four stackers 12 that can each hold multiple discs; two disc drives 13 for writing data to the recording surface of the discs; a disc printer 14 that prints on the label surface on the opposite side of the disc as the recording surface; and an automatic loader 15 that conveys discs between the stackers 12, the disc drives 13, and the disc printer 14.

Note that this embodiment is not limited to connecting a single publisher 2 to the host 3, and plural publishers 2 could be connected to the host 3.

The USB hub 11 is a communication interface (physical interface) enabling connection and communication between the host 3 and the plural devices (in this example, two disc drives 13, the disc printer 14, and the automatic loader 15) inside the publisher 2, and includes USB interfaces (communication interfaces) 16, 17 connecting the host 3 to the individual devices through cables, and a USB hub controller 18 that handles detecting connection of and distributing signals to the devices.

The USB hub 11 sequentially outputs received image files to the disc drives 13, sequentially outputs received print data to the disc printer 14, and sequentially outputs received conveyance control data to the automatic loader 15, by outputting data sent from the host 3 to the respective devices.

The host 3 could be a common personal computer, and has a USB interface (communication interface) 20 for communicating with the publisher 2; an input unit 21 such as a keyboard or mouse; a display unit 22 with a display panel; a control unit 23 that controls other parts; and a storage device (storage unit) 24 such as a hard disk drive or a flash memory drive for reading and writing control programs and other data.

The USB interface 20 is an interface known from the literature that is not limited to connecting one or a plurality of publishers 2, and can connect to USB devices other than publishers 2.

The control unit 23 is composed of hardware devices such as a CPU (Central Processing Unit), ROM (Read Only Memory), and RAM (Random Access Memory). The host 3 can be made to function as the control device of the publisher 2 by installing programs and data such as a management application 31 and driver application 32 for the publisher 2 in the host 3.

The driver application 32 for the publisher 2 includes a central control unit 41, a data processing unit 42, a print data generating unit 43, two drive control units 44, a printer control unit 45, and a loader control unit 46.

The central control unit 41 stores data and process settings for parts of the media processing device 1, schedules disc processing (publishing processes including writing data and printing), and controls the operating sequence of parts of the publisher 2.

The central control unit 41 thus efficiently controls operation of the two disc drives 13, disc printer 14, and automatic loader 15 so that they do not interfere with each other.

The data processing unit 42 generates an image file (such as an ISO file) in an archive file format for writing data, or converts an image file read from a previously written disc into plural files and stores the files in the storage device 24.

These image files are generated to contain the data specified for storage (single or plural files stored in the storage device 24, or single or plural files read from disk). To write an image file to a disc, the image file is sent to the publisher 2 and written thereby to disc.

The print data generating unit 43 generates print data (such as a PRN file) for printing on the label side of the disc. This print data is generated based on the print image specified (or created) by the user operating the host 3.

The drive control units 44 sequentially output image files to the disc drives 13 of the publisher 2 as scheduled by the central control unit 41, and controls the writing process of each disc drive 13.

The printer control unit 45 sequentially outputs print data to the disc printer 14 of the publisher 2 as scheduled by the central control unit 41, and controls the printing process of the disc printer 14.

The loader control unit 46 sequentially generates and outputs conveyance control data to the automatic loader 15 of the publisher 2 as scheduled by the central control unit 41, and controls the conveyance process of the automatic loader 15.

The management application 31 for the publisher 2 is an application that provides a graphical user interface (GUI) to the user, and displays screens such as an operating screen (GUI) on the display unit 22. More specifically, the management application 31 includes a data acquisition unit 51, a data processing unit 52, and a display control unit 53.

The data acquisition unit 51 acquires from the driver application 32 device information (the remaining ink level in the disc printer 14, management information (how many discs are loaded and the type of discs) for each stacker 12, and the operating status of each process device), and information about the data communication path between the host 3 and publisher 2 (information about compatibility with the transfer modes of the driver application 32, USB interface 20, and USB cable 4).

The data processing unit 52 executes processes corresponding to the user commands input through the GUI. As a result, the data processing unit 52 functions as an image generating unit that generates images such as the operating screen and print images for the disc publishing process in response to specific user operations, a display process that displays operating screens on the display unit 22 in cooperation with the display control unit 53, and a process execution unit (publishing process execution unit) that detects operation of buttons (also referred to as icons) displayed on the operating screen, and executing specific processes corresponding to the operations (including the publishing process).

The display control unit 53 displays the operating screen and other windows on the display unit 22 as controlled by the data processing unit 52.

The media processing device 1 in this embodiment can store multiple discs in the stackers 12, and by conveying the discs from the stackers 12 to the disc drive 13 and disc printer 14 by means of the automatic loader 15, sequentially writes data and prints an image on the plural discs, thereby publishing (producing) plural pre-recorded discs.

The USB hub 11 in this embodiment is a USB hub that is compatible with the USB 3.0 standard (that is, is a USB 3.0 hub). USB 3.0 is backwards compatible with USB 2.0, and is an interface standard that uses more signal lines than USB 2.0, and enables faster communication.

More specifically, USB 3.0 adds five lines to the four lines used in USB 2.0, and when a device that is compatible with the USB 2.0 standard and incompatible with the USB 3.0 standard (that is, a USB 2.0 device) is connected, the additional five lines are not used, and communication is based on the USB 2.0 standard. When a device that is compatible with the USB 3.0 standard (that is, a USB 3.0 device) is connected, communication is based on the USB 3.0 standard.

The USB interface 20 of the host 3 is USB 3.0 compatible.

Figure 2:
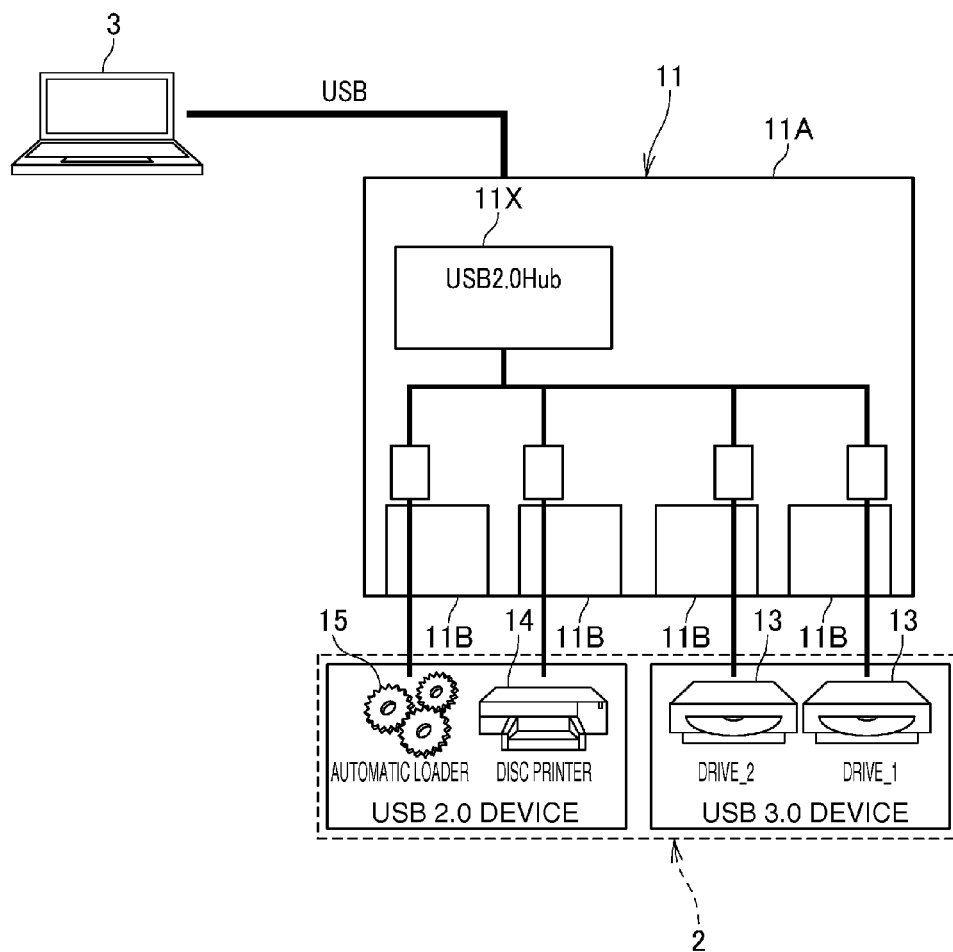
FIG. 2 schematically shows the configuration of a system in which a single publisher is connected to a host device and all devices in the publisher are USB 2.0 devices.

FIG. 2 schematically shows the connections between a host 3 connected to a single publisher 2 when all devices in the publisher 2 are recognized as USB 2.0 devices. In FIG. 2 reference numeral 11A denotes the circuit board of the USB hub 11, and reference numeral 11B denotes the device-side connector (connection unit) disposed on the circuit board 11A. For convenience of comparison with FIG. 4, drive_1 and drive_2 in FIG. 2 are USB 3.0 devices, but the recognition result of the USB connections (FIG. 3) described below does not change.

The USB hub 11 has a USB device connection detection function, and detects connection of a device to each connector 11B (the two disc drives 13 (drive_1 and drive_2)), the disc printer 14 (printer), and automatic loader 15 (arm) using this function.

The host 3 also detects the device (USB hub 11 and devices connected to the USB hub 11) connected to the USB interface 20 by means of a USB device connection detection function.

Figure 3:
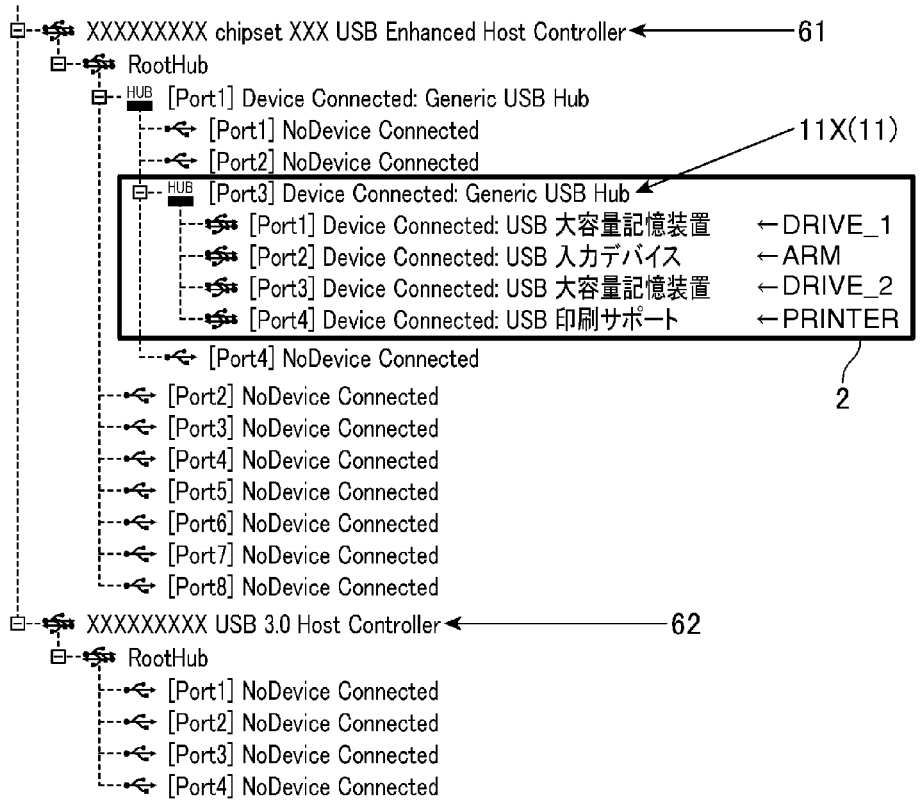
FIG. 3 shows the result of recognizing the USB connections to the host in the configuration shown in FIG. 2.

FIG. 3 shows the results of recognizing USB connections by the host 3 in the configuration shown in FIG. 2 (in which the automatic loader and disc printer are USB 2.0 devices). Note that as shown in FIG. 3, the host 3 in this embodiment has a host controller 61 (below, first host controller) compatible with the USB 2.0 standard, and a host controller 62 (below, second host controller) compatible with the USB 3.0 standard. FIG. 3 shows the publisher 2 connected by a USB connection to the USB interface of the first host controller 61.

FIG. 3 shows the physical connections recognized by the host 3. The host 3 recognizes that USB hub 11 connected to a single port (Port3 in FIG. 3) is connected to the root hub of the first host controller 61. This USB hub 11 is equivalent to a USB 2.0 hub shown in FIG. 2, and the host 3 recognizes that the USB devices (drive_1, drive_2, printer, arm) in the publisher 2 are each connected to a port in USB 2.0 hub 11X.

When all USB devices in the publisher 2 are USB 2.0 devices, the host 3 thus recognizes the USB devices (drive_1, drive_2, printer, arm) in the publisher 2 through the single USB 2.0 hub 11X connected through the root hub.

As a result, the host 3 can coordinate operation of the disc drives 13, disc printer 14, and automatic loader 15 in the publisher 2 to record data and print on the media by group control of USB device groups by USB 2.0 hub 11X unit.

If plural publishers 2 (publishers 2 containing only USB 2.0 devices) are connected to the host 3, the host 3 recognizes the USB devices (drive_1, drive_2, printer, arm) in the same publisher 2 through the USB 2.0 hub 11X in each publisher 2.

In this event, the host 3 can appropriately record data and print on the media by publisher 2 unit by group control of USB device groups by USB 2.0 hub 11X unit.

Note that FIG. 3 describes an example in which the publisher 2 is connected through a USB connection to the USB interface of the first host controller 61, but the host 3 can also appropriately record data and print on the media by publisher 2 unit by group control of USB device groups by USB 2.0 hub 11X unit when the publisher 2 is connected through a USB connection to the USB interface of the second host controller 62.

Operation when a publisher 2 with a mixture of USB 2.0 devices and USB 3.0 devices is connected to the host 3 is described next. For simplicity below, a publisher 2 with a mixture of USB 2.0 devices and USB 3.0 devices is identified as publisher 2M for differentiation from a publisher 2 that does not have a mixture of USB 2.0 and USB 3.0 devices.

Figure 4:
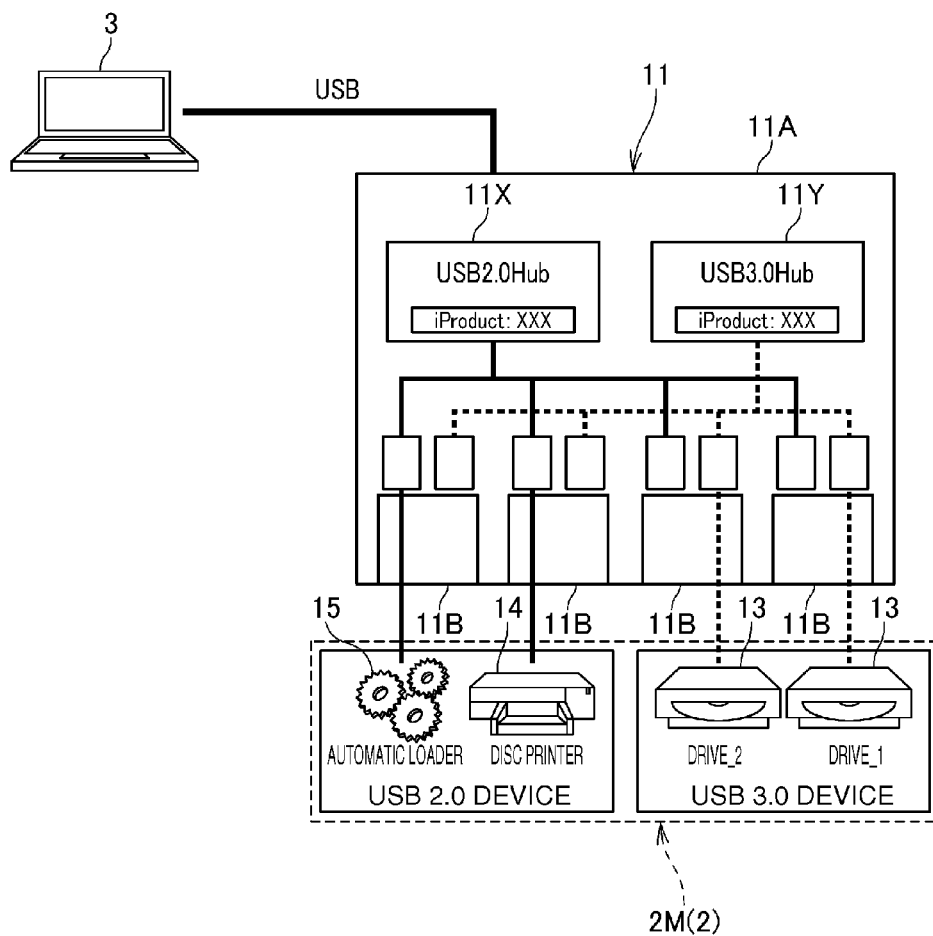
FIG. 4 schematically shows the configuration of a system in which a publisher containing both USB 2.0 devices and USB 3.0 devices is connected to the host.
Figure 5:
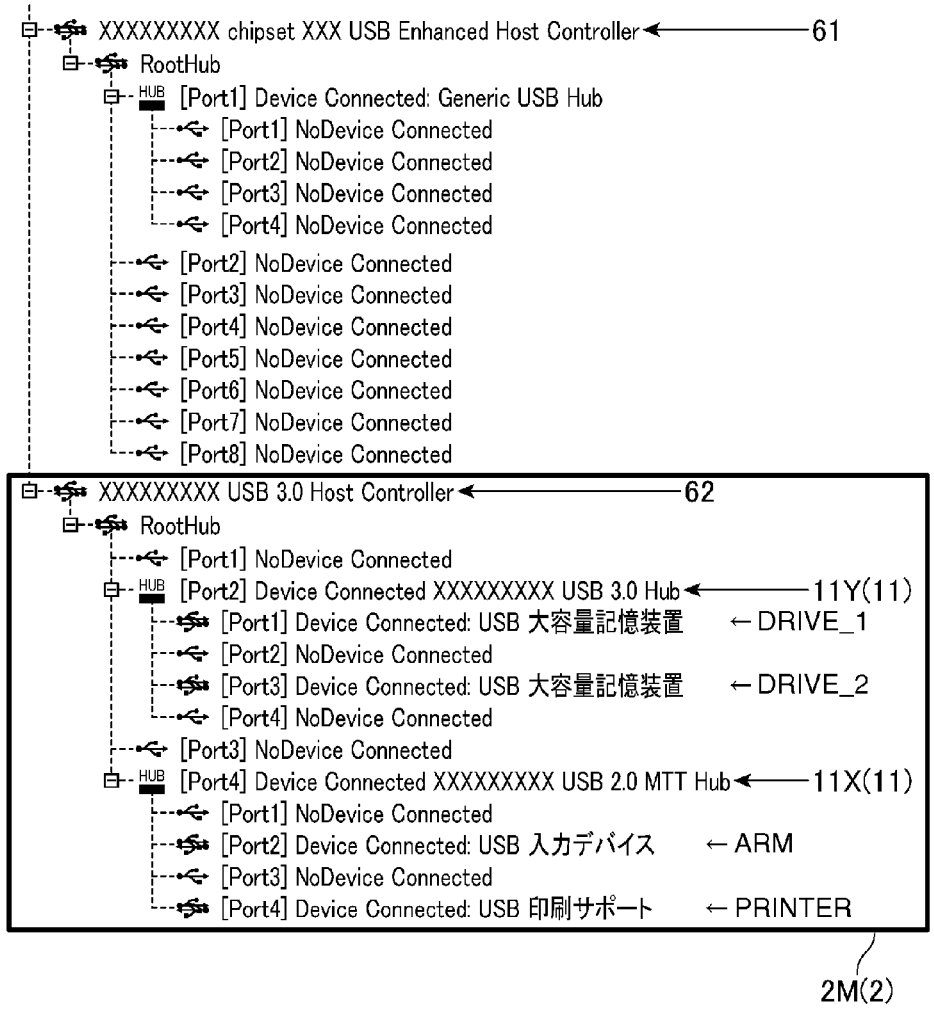
FIG. 5 shows the result of recognizing the USB connections to the host in the configuration shown in FIG. 4.

FIG. 4 schematically describes the connection of publisher 2M with the host 3. FIG. 5 shows the results of recognizing USB connections (physical connections) by the host 3 in the configuration shown in FIG. 4. The publisher 2M in this configuration connects to the second host controller 62, which is compatible with USB 3.0.

In this configuration as shown in FIG. 5, the host 3 logically recognizes the USB 3.0 hub 11Y (USB 3.0 hub, see FIG. 4, FIG. 5) connected to a port (Port2 in FIG. 5) of the root hub of the second host controller 62; recognizes USB 2.0 hub 11X (see FIG. 4, FIG. 5) connected to another port (Port4 in FIG. 5); recognizes USB 3.0 devices (drive_1 and drive_2 in FIG. 4, FIG. 5) connected to the USB 3.0 hub 11Y; and recognizes the USB 2.0 devices (printer, arm in FIG. 4, FIG. 5) connected to the USB 2.0 hub 11X.

More specifically, when there is a mixture of USB 2.0 devices and USB 3.0 devices, the host 3 logically recognizes the one USB hub 11 to which the USB devices are physically connected as a USB 2.0 hub 11X to which USB 2.0 devices are connected, and a USB 3.0 hub 11Y to which USB 3.0 devices are connected. In other words, the physical USB hub 11 is a physical interface, and the two logical USB hubs (USB 2.0 hub, USB 3.0 hub) 11X and 11Y are logical interfaces.

As a result, when both USB 2.0 devices and USB 3.0 devices are present, the host 3 logically recognizes two USB hubs 11X and 11Y. The devices in a publisher 2M with a mixture of USB 2.0 devices and USB 3.0 devices are thus recognized by the host 3 as logically connected to different USB hubs 11X and 11Y. It is therefore difficult for the host 3 based only on the recognition results to determine if the USB 2.0 devices and USB 3.0 devices are devices in the same publisher 2, or are devices outside the publisher 2.

Figure 6:
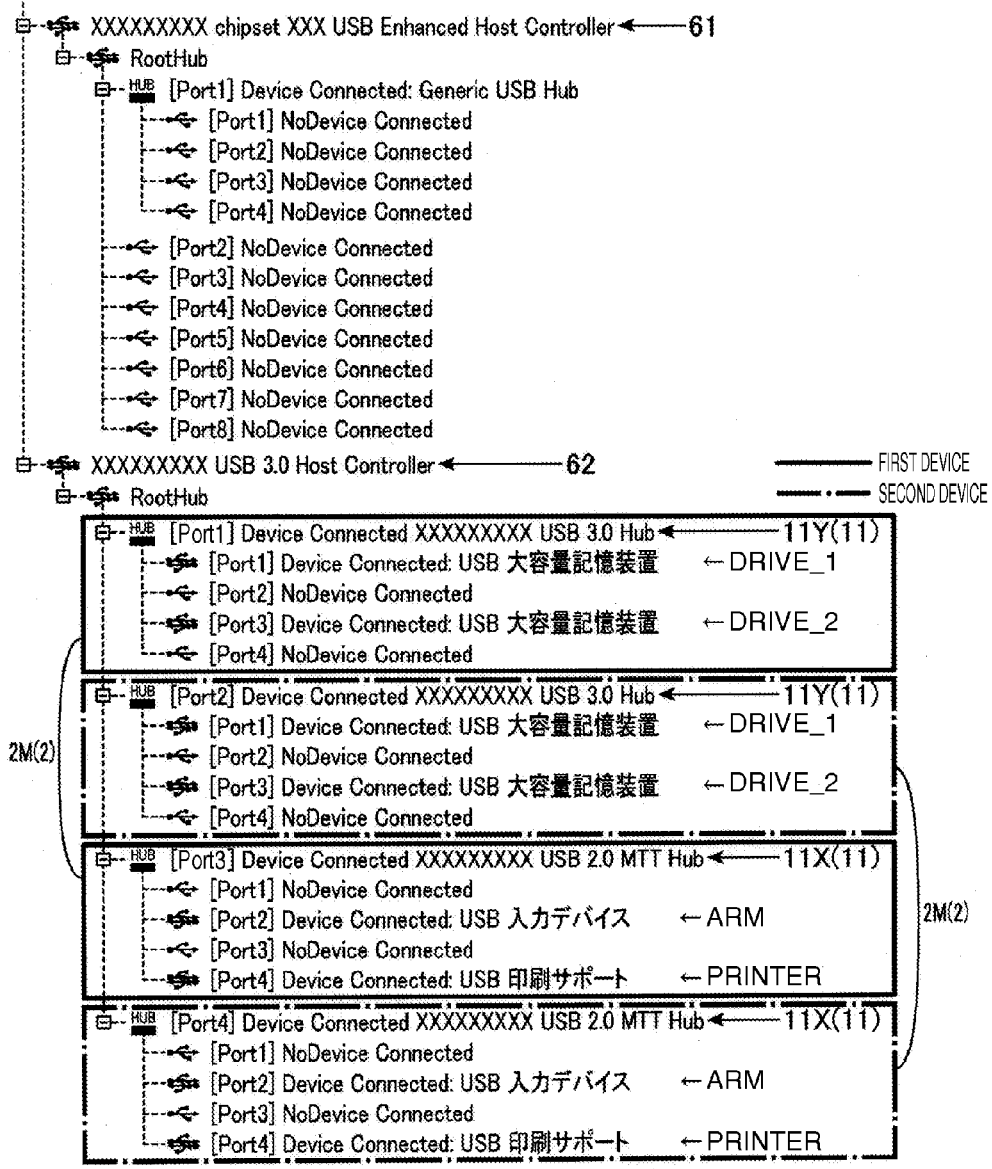
FIG. 6 shows the result of recognizing the USB connections to the host when two publishers containing both USB 2.0 devices and USB 3.0 devices are connected to the host.

Connecting plural publishers 2M to the host 3 is described next. FIG. 6 shows the result of the host 3 recognizing connection (physical connection) of two publishers 2M by the host 3. The publisher 2M in this configuration connects to the second host controller 62, which is compatible with USB 3.0.

In this event, the host 3 recognizes a first USB 3.0 hub 11Y connected to a port (Port1 in FIG. 6) of the root hub of the second host controller 62; recognizes a second USB 3.0 hub 11Y connected to another port (Port2 in FIG. 6); recognizes a first USB 2.0 hub 11X connected to another port (Port3 in FIG. 6); and recognizes a second USB 2.0 hub 11X connected to another port (Port4 in FIG. 6).

The host 3 also detects connection of the USB 3.0 devices (drive_1, drive_2 in FIG. 6) in the first publisher 2M through the first USB 3.0 hub 11Y, and detects the USB 3.0 devices (drive_1, drive_2 in FIG. 6) in the second publisher 2M through the second USB 3.0 hub 11Y. The host 3 also detects connection of the USB 2.0 devices (printer and arm in FIG. 6) in the first publisher 2M through the first USB 2.0 hub 11X, and detects connection of the USB 2.0 devices (printer and arm in FIG. 6) in the second publisher 2M through the second USB 2.0 hub 11X.

The first USB 3.0 hub 11Y and first USB 2.0 hub 11X are thus logical interfaces equivalent to the USB hub (physical interface) 11 of the first publisher 2M, and the second USB 3.0 hub 11Y and second USB 2.0 hub 11X are thus logical interfaces equivalent to the USB hub (physical interface) 11 of the second publisher 2M.

As a result, when two publishers 2M are connected to the host 3, the devices in the respective publishers 2M are logically recognized through four USB hubs (logical interfaces) 11Y, 11X, 11Y, 11X. It is therefore difficult for the host 3 based only on the recognition results to determine if the plural USB devices are devices in the same publisher 2, or are independent devices outside the publisher 2.

As described above, when one or a plurality of publishers 2M each having a mixture of USB 2.0 devices and USB 3.0 devices is connected, identifying the USB device groups by publisher 2 unit is difficult based on the logical configuration.

To solve this problem, this embodiment preassigns a common identifier (identification information, XXX in FIG. 4) that identifies devices in the same group to the plural hubs (USB 2.0 hub 11X, USB 3.0 hub 11Y) in each same publisher 2M. The control unit 23 of the host 3 thus identifies the group of devices connected to the USB 2.0 hub and USB 3.0 hub having the common identifier as a device group in the same publisher 2M, and recognizes USB device groups by publisher 2 unit.

The iProduct index of the USB 2.0 hub and USB 3.0 hub in the same publisher 2M is used as the common identifier in this example. The iProduct index is a value that can be set by the device manufacturer at the time of manufacture, and can be detected by the host 3. In other words, the manufacturer (or reseller) of the publisher 2 assigns the identifier indicating that devices belong to the same group by setting a common iProduct index to the USB 2.0 hub and USB 3.0 hub in the same publisher 2.

A different value is set as the common identifier iProduct in each publisher 2. As a result, when plural publishers 2 are connected to the host 3, each publisher 2 can be uniquely recognized based on the assigned iProduct index.

A vendor ID, product ID, and other identification information is also assigned to the USB 2.0 hub 11X and USB 3.0 hub 11Y of the publisher 2 according to the USB standard as known from the literature.

The vendor ID is the vendor ID of the manufacturer or company that acquired the vendor ID, and in this embodiment the vendor ID AAA of the manufacturer of the publisher 2 is assigned to both USB hubs 11X and 11Y. The product ID is a code assigned by the company with the vendor ID to each product or model so that there is no duplication of ID numbers, and in this embodiment the product ID BBB denoting the model is assigned to USB hubs 11X and 11Y.

Figure 7:
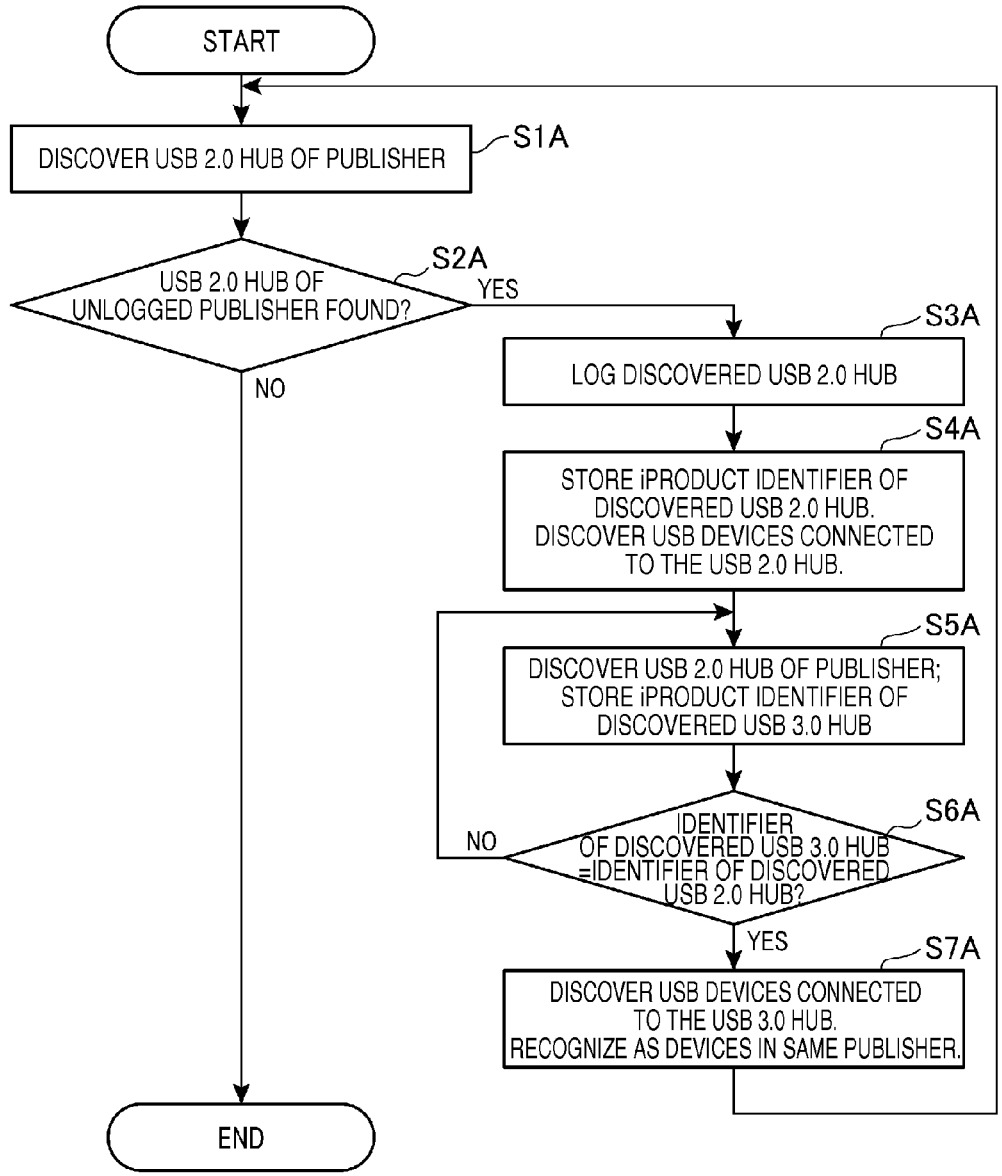
FIG. 7 is a flow chart of recognition control of the publisher by the host device.

FIG. 7 is a flow chart showing control of publisher 2 recognition by the host 3.

This recognition control process is executed by a function of the data acquisition unit 51 or data processing unit 52, and the driver application 32, of the control unit 23 of the host 3. This recognition control process is executed when connection of a USB device is detected, or recognition is started by a command from the user through the input unit 21.

The control unit 23 first looks for a USB 2.0 hub 11X (see FIG. 4) in an unlogged publisher 2 (step S1A).

Whether or not there is a USB 2.0 hub 11X in the publisher 2 can be determined based on the information acquired by the USB connection detection function (such as identification information (vendor ID or product ID, for example) other than the iProduct index set in the USB 2.0 hub 11X).

For example, if the vendor ID and product ID of the discovered USB 2.0 hub 11X is the vendor ID AAA and product ID BBB of a previously discovered publisher 2, the host 3 recognizes the USB 2.0 hub 11X of publisher 2. The disclosure is not limited to this method, however, and whether or not the publisher 2 has a USB 2.0 hub 11X can be determined using other known methods (such as hot plug detection methods).

If the USB 2.0 hub 11X of an unlogged publisher 2 is not found (step S2A returns NO), the control unit 23 ends recognition control. However, if a USB 2.0 hub 11X is found (step S2A returns YES), the control unit 23 logs the discovered USB 2.0 hub 11X (step S3A), acquires and stores the iProduct identifier of that USB 2.0 hub 11X in the storage device 24, and recognizes the USB devices connected to that USB 2.0 hub 11X (step S4A).

Recognition of USB devices includes the host 3 determining that the USB devices are a disc printer 14 (printer) and automatic loader 15 (arm), which are the USB 2.0 devices in the publisher 2.

Next, the control unit 23 looks for a USB 3.0 hub 11Y (see FIG. 4) in the publisher 2, and acquires and stores the iProduct identifier of that USB 3.0 hub 11Y in the storage device 24 (step S5A). The control unit 23 then determines if the iProduct identifier of the USB 3.0 hub 11Y stored in the storage device 24 matches the iProduct identifier of the USB 2.0 hub 11X acquired in the preceding step S4A (step S6A).

If the values match (step S6A returns YES), the control unit 23 confirms the USB devices (disc drives 13 (drive_1, drive_2)) connected to the USB 3.0 hub 11Y, and determines that these USB devices and the USB devices discovered in step S4A are devices in the same publisher 2 (step S7A).

If the values in step S6A do not match (step S6A returns NO), the control unit 23 returns to step S5A, and looks again for a USB 3.0 hub 11Y in the publisher 2. Discovery thus repeats in step S5A until the iProduct identifier of the USB 3.0 hub 11Y and the iProduct identifier of the USB 2.0 hub 11X match, and a USB 2.0 hub 11X and USB 3.0 hub 11Y with the same iProduct identifier can be discovered.

When step S7A executes and ends, the control unit 23 returns to step S1A. As a result, the process of steps S1A to S7A repeats until a USB 2.0 hub 11X in an unlogged publisher 2 is not found (step S2A returns NO). As a result, all USB 2.0 hubs 11X and USB 3.0 hubs 11Y that have the same iProduct identifier can be found. When discovery ends, the control unit 23 ends recognition control.

Because the USB 2.0 hub 11X and USB 3.0 hub 11Y with the same iProduct identifier are hubs in the same publisher 2, the control unit 23 recognizes the USB 2.0 hub 11X and USB 3.0 hub 11Y with the same iProduct identifier as interfaces associated with the same group of devices, and determines that the USB 2.0 devices and USB 3.0 devices connected to these USB hubs 11X and 11Y are in the same group, that is, recognizes them as a device group in the same publisher 2, and thereafter controls them as a group.

As a result, when a media production command is input by the user through the input unit 21, the control unit 23 coordinates operation of the USB 2.0 devices and USB 3.0 devices connected to the USB 2.0 hub 11X and USB 3.0 hub 11Y of the same group, and can appropriately record data and print on the media.

As described above, because an iProduct identifier enabling recognition by the host 3 side (control unit 23) as belonging to the same group is assigned to a USB 2.0 hub 11X and USB 3.0 hub 11Y in the same publisher 2, the host 3 (control unit 23) determines whether or not devices belong to the same group based on the iProduct identifier, and coordinates operation of the plural USB devices connected to the USB 2.0 hub 11X and USB 3.0 hub 11Y determined to be in the same group, a group of USB devices in the same publisher 2 can be identified, and the USB devices can be controlled by publisher 2 unit.

Furthermore, because a common iProduct identifier is assigned to the USB 2.0 hub 11X and USB 3.0 hub 11Y in the same publisher 2, the host 3 (control unit 23) can easily determine if devices are in the same group.

In addition, because the USB 2.0 hub 11X and USB 3.0 hub 11Y are the same USB hub 11 to which the USB device group in the publisher 2 is physically connected, the USB device group in the publisher 2 can be identified by USB hub 11 unit when there is a combination of USB 2.0 devices and USB 3.0 devices. Therefore, when there is a combination of USB 2.0 and USB 3.0 devices, group control can be asserted using the same method as in the related art, and group control by publisher 2 unit is possible when there is a mixture of USB 2.0 and USB 3.0 devices.

Yet further, because the USB 2.0 hub 11X discovery range is limited to USB 2.0 hubs 11X in the same publisher 2 based on the vendor ID and product ID that are set in the USB 2.0 hub 11X when searching for USB 2.0 hubs 11X (see step S1A), USB 2.0 hubs 11X in the same publisher 2 can be found efficiently.

Embodiment 2

If the iProduct identifier of the USB hub cannot be acquired in the first embodiment, whether or not the group of devices connected to the USB 2.0 hub 11X and USB 3.0 hub 11Y belong to the same publisher 2 cannot be determined.

Depending upon the USB chip (USB circuit), however, acquiring the iProduct identifier that is acquirable according to the USB standard may not be possible. The second embodiment controls recognition so that a device group in the same publisher 2 can be identified even when the iProduct identifier cannot be obtained.

Figure 8:
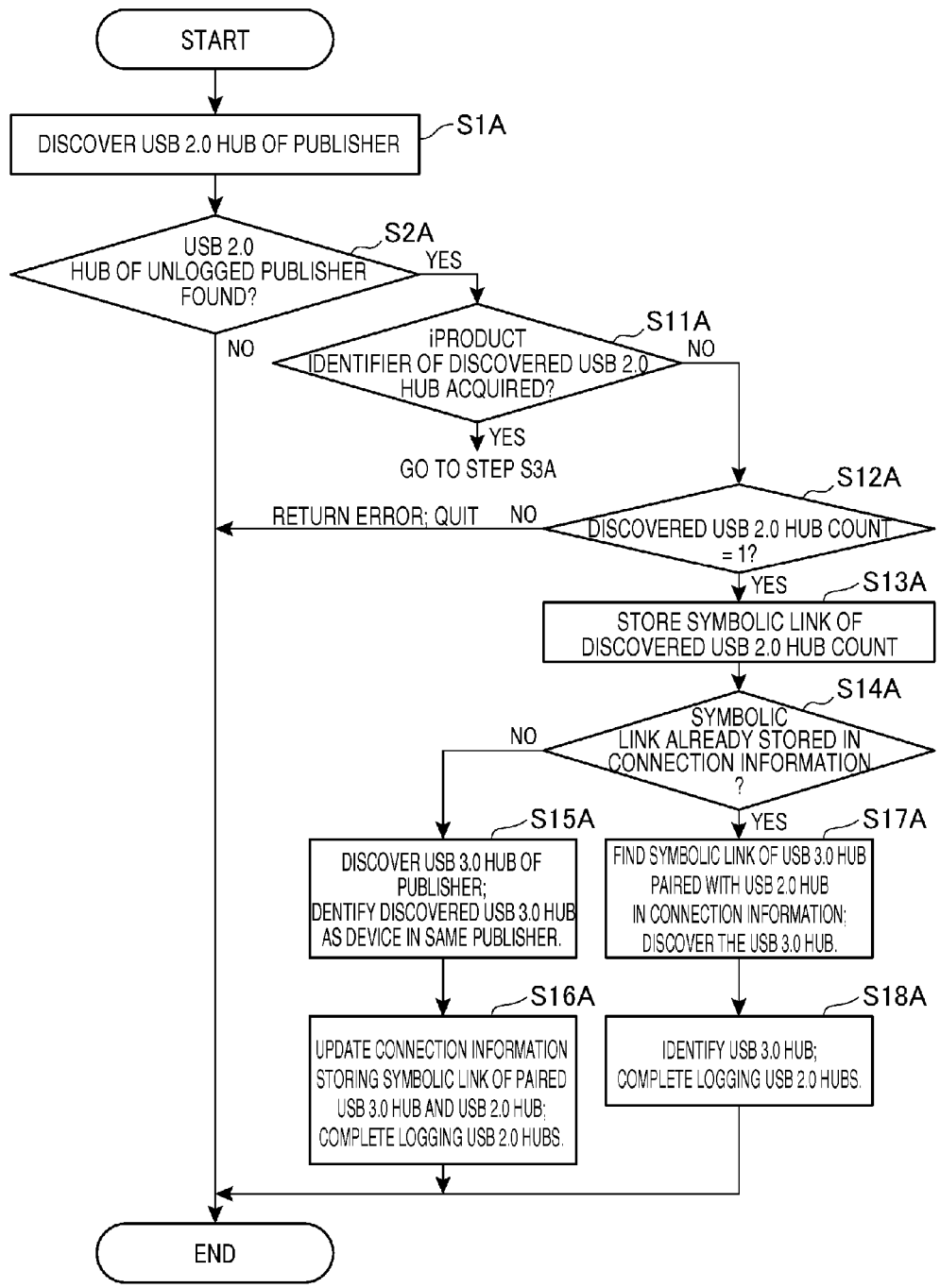
FIG. 8 is a flow chart of recognition control of the publisher by the host device in a second embodiment.

FIG. 8 is a flow chart of publisher 2 recognition control by the host 3 according to the second embodiment. Note that like parts in this and the first embodiment are identified by like reference numerals, and further description therefore is omitted.

The control unit 23 first looks for the USB 2.0 hub 11X (see FIG. 4) of an unrecognized publisher 2 (step S1A). The control unit 23 can efficiently find the USB 2.0 hubs 11X in the publisher 2 by searching based on the vendor ID and product ID.

When a USB 2.0 hub 11X is found in an unrecognized publisher 2, the control unit 23 determines if the iProduct identifier of the found USB 2.0 hub 11X was acquired (step S11A).

If the iProduct identifier was acquired (step S11A returns YES), the control unit 23 goes to step S3A in FIG. 7, and determines if the group of devices connected to the USB 2.0 hub 11X and USB 3.0 hub 11Y are in the same publisher 2 based on the iProduct identifier as described in the first embodiment.

However, if the iProduct identifier could not be obtained (step S11A returns NO), the control unit 23 determines if there is only one USB 2.0 hub 11X in the unlogged publisher 2 (step S12A). If the detected number is more than 1 (is plural) (step S12A returns NO), an error is returned and the process ends. However, if the detected count is 1 (step S12A returns YES), the symbolic link of the found USB 2.0 hub 11X is stored in the storage device 24 (step S13A).

This symbolic link is identification information specified by the operating system (OS) of the host 3. In this embodiment as described below, connection information using the symbolic link of the USB 2.0 hub 11X and USB 3.0 hub 11Y in the same publisher 2 is stored in the storage device 24.

When the symbolic link of the found USB 2.0 hub 11X is acquired, the control unit 23 references the connection information and determines if the symbolic link has already been logged (step S14A).

If the symbolic link has not been logged (step S14A returns NO), the control unit 23 looks for a USB 3.0 hub 11Y in the publisher 2 (see FIG. 4), and if a USB 3.0 hub 11Y is found, determines if the USB 3.0 hub 11Y is paired with the previously discovered USB 2.0 hub 11X, that is, is a device in the same publisher 2 (step S15A).

As in step S1A, the control unit 23 can efficiently discover devices by looking for a USB 3.0 hub 11Y in the publisher 2 based on the vendor ID and product ID.

When a USB 3.0 hub 11Y paired with the discovered USB 2.0 hub 11X is discovered, the control unit 23 acquires the symbolic link of the paired USB 3.0 hub 11Y, adds information pairing the symbolic links of the USB hubs 11X and 11Y and updates the connection information, completes logging the discovered USB 2.0 hub 11X (step S16A), and ends recognition control.

When there is a USB 2.0 hub 11X that is not logged in the connection information, this embodiment thus looks for a USB 3.0 hub 11Y, and if a USB 3.0 hub 11Y is found, adds the USB 3.0 hub 11Y and the USB 2.0 hub 11X that was found immediately before as a hub pair (a hub associated with the same device group) to the connection information. As a result, connection information that is a database of USB hubs 11X and 11Y in the same publisher 2 can be automatically created and updated.

If in step S14A the symbolic link of the discovered USB 2.0 hub 11X is already logged in the connection information (step S14A returns YES), the control unit 23 references the connection information to find the symbolic link of the USB 3.0 hub 11Y paired with the USB 2.0 hub 11X, and determines if the USB 3.0 hub 11Y of that symbolic link is connected (step S17A). If the paired USB 3.0 hub 11Y is found, the control unit 23 completes logging the discovered USB 2.0 hub 11X (step S18A), and ends recognition control.

When a media production command is input by the user through the input unit 21 after recognition control ends, the control unit 23 coordinates operation of the USB 2.0 devices and USB 3.0 devices connected to the USB 2.0 hub 11X and USB 3.0 hub 11Y determined to be in the same publisher 2, and can thereby appropriately record data and print on the media by publisher 2 unit.

As described above, when the iProduct identifier of the USB 2.0 hub 11X in a publisher 2 cannot be acquired, but the USB 2.0 hub 11X of the publisher 2 is identified by a parameter (vendor ID and product ID) other than the iProduct identifier, and a USB 2.0 hub 11X and USB 3.0 hub 11Y that are unlogged interfaces are discovered, the second embodiment determines that the USB hubs 11X and 11Y are in the same publisher 2 and coordinates operation of the plural USB devices connected to the USB hubs 11X and 11Y, and can therefore control USB device groups by publisher 2 unit even when the iProduct identifier cannot be acquired.

Furthermore, because the range for discovering USB 2.0 hub 11X and USB 3.0 hub 11Y is limited to USB 2.0 hubs 11X and USB 3.0 hubs 11Y in same the publisher 2 based on the vendor ID and product ID, the USB hubs 11X and 11Y of a publisher 2 can be discovered efficiently.

In addition, because connection information logging the USB hubs 11X and 11Y identified as hubs in a particular publisher 2 is created, the USB hubs 11X and 11Y recorded in the connection information can be easily identified as a set in the same publisher 2 based on the connection information.

As a result, USB device groups can be efficiently identified by publisher 2 unit even when the iProduct identifier cannot be acquired.

Using the iProduct identifier as the common identification information identifying belonging to the same group is described above, but if there is a parameter that can be set as the common identification information other than the iProduct identifier, that parameter could be used as the common identification information identifying belonging to the same group.

Determining whether or not a plurality of USB 2.0 hubs 11X and USB 3.0 hubs 11Y to which multiple devices are connected belong to the same publisher 2 is described above, but the disclosure is not limited to USB 2.0 and USB 3.0, and can obviously be applied to determine whether a plurality of USB hubs compatible with a new USB standard introduced in the future belong to the same electronic device.

The disclosure is also not limited to USB hubs, and when the device interface is compatible with multiple different interface standards and is recognized as a plurality of interfaces when devices compatible with the different interface standards are connected, the disclosure can be broadly applied to determine whether or not the plural recognized interfaces belong to the same group (such as when the interfaces are in the same electronic device).

The second embodiment looks for a USB 3.0 hub 11Y and determines that the two USB hubs 11X and 11Y belong to the same group only when a USB 2.0 hub 11X of an unlogged publisher 2 is detected even if the iProduct identifier cannot be obtained, but the disclosure is not so limited. For example, if two unlogged USB hubs 11X and 11Y are detected, the two USB hubs 11X and 11Y could be determined to belong to the same group without acquiring the iProduct identifier.

In addition, if there are three or more interfaces (including logical interfaces and physical interfaces) recognized by the control unit 23 in the same publisher 2, and there are plural unlogged interfaces, those interfaces can be determined to be in the same group even if the iProduct identifier cannot be acquired. More specifically, the configuration of the publisher 2 or other target device and the configuration of interfaces can be changed desirably.

The foregoing embodiments describe a publisher 2 that records data on the disc recording surface by means of multiple devices, and prints an image on the label surface on the opposite side of the disc as the recording surface, but the disclosure can be broadly applied to media publishing devices that record data and print an image on media other than disc media.

The disclosure is also not limited to application with media processing (publishing) devices, and can be broadly applied to device control systems that coordinate operation of multiple devices through an interface.

The control program for executing recognition control as described above is previously stored in the storage device 24 of the host 3 in the embodiments described above, but the disclosure is not so limited. The control program could alternatively be stored on a non-transitory computer-readable recording medium such as magnetic recording media, optical recording media, and semiconductor recording media, and a computer may read and execute the control program from the recording medium. The control program could also be downloaded from a data server on a communication network.

Further alternatively, the configuration and processes of the media processing device 1, publisher 2, and host 3 are not limited to the foregoing, and can be desirably modified in many ways without departing from the scope of the accompanying claims.

The disclosure being thus described, it will be apparent that it may be varied in many ways. Such variations are not to be regarded as a departure from the spirit and scope of the disclosure, and all such modifications as would be obvious to one skilled in the art are intended to be included within the scope of the following claims.

What is claimed is:

1. A device control system comprising:
an interface to which a plurality of devices connect; and
a control unit that connects and communicates with the plurality of devices through the interface; wherein
the interface being an interface that is compatible with a plurality of interface standards, and is recognized as a plurality of interface hubs by the control unit when the plurality of devices of different interface standards are connected, and
identification information enabling recognition by the control unit, across the plurality of interface hubs, as interfaces in a same group among a plurality of groups is set in each of the recognized plurality of interfaces;
the control unit determines, across the plurality of interface hubs, whether or not interfaces are in the same group based on the identification information of the recognized plurality of interface hubs; and
the control unit coordinates operation of the plurality of devices connected to the plurality of interface hubs in the same group as a single device group to perform disc processing on a single piece of media using the plurality of devices;
wherein common identification information is set in the plurality of interface hubs in the same group to further enable grouping of interface hubs within the same group by the control unit when the plurality of devices are connected to the control unit via different ones of the plurality of interface hubs.

2. The device control system described in claim 1, wherein:
the interface is a single physical interface to which the plurality of devices physically connect, and is logically recognized as a plurality of interface hubs when a plurality of devices of different interface standards are connected.

3. The device control system described in claim 1, wherein:
the interface is a USB hub disposed between the control unit and the plurality of devices.

4. The device control system described in claim 1, wherein:
a plurality of interface settings that are determined according to an interface standard are set in the recognized plurality of interface hubs, and one of these settings is used as the identification information; and
when the identification information cannot be acquired, and a plurality of unlogged interfaces of which an interface setting other than the identification information satisfies a particular condition are present, the control unit determines those plural interface hubs are in the same group, and coordinates operation of the plurality of devices connected to the interfaces of the same group.

5. The device control system described in claim 4, wherein:
the interface setting other than the identification information includes a vendor identification ("ID") and a product ID; and
the control unit limits a discovery range of the interfaces to which the plurality of devices connect based on the vendor ID and product ID.

6. A host device that connects and communicates with an electronic device having an interface to which a plurality of devices connect, and controls the plurality of devices of the electronic device through the interface, the host device comprising:
a control unit that recognizes the interface as a plurality of interface hubs when a plurality of devices of different interface standards are connected to the interface, and when identification information enabling recognition by the control unit as recognized interfaces in a same group among a plurality of groups is set in each of the recognized plurality of interface hubs, and
coordinates operation of the plurality of devices connected to plurality of interface hubs determined to be in the same group based on the identification information as a single device group to perform disc processing on a single piece of media using the plurality of devices,
wherein common identification information is set in the plurality of interface hubs in the same group to further enable grouping of interface hubs within the same group by the control unit when the plurality of devices are connected to the control unit via different ones of the plurality of interface hubs.

7. The host device described in claim 6, wherein:
a plurality of interface settings that are determined according to an interface standard are set in the plurality of recognized interfaces, and one of these settings is used as the identification information; and
when the identification information cannot be acquired, and a plurality of unlogged interfaces of which an interface setting other than the identification information satisfies a particular condition are present, the control unit determines those plural interface hubs are in the same group, and coordinates operation of the plurality of devices connected to the interfaces of the same group.

8. The host device described in claim 7, wherein:
the interface setting other than the identification information includes a vendor identification ("ID") and a product ID; and
the control unit limits a discovery range of the interfaces to which the plurality of devices connect based on the vendor ID and product ID.

9. A control method of a host device that connects and communicates with an electronic device having an interface to which a plurality of devices connect, and controls the plurality of devices of the electronic device through the interface, the method comprising:
recognizing the interface as a plurality of interface hubs when a plurality of devices of different interface standards are connected to the interface; and
performing disc processing on a single piece of media with the plurality of devices by coordinating operation, as a single device group, of the plurality of devices connected to plurality of interface hubs determined to be in a same group among a plurality of groups based on the identification information when identification information enabling recognition as interface hubs in the same group is set in each of the recognized interface hubs,
wherein common identification information is set in the plurality of interface hubs in the same group to further enable grouping of interface hubs within the same group when the plurality of devices are connected via different ones of the plurality of interface hubs.

10. The control method of a host device described in claim 9, wherein:
a plurality of interface settings that are determined according to an interface standard are set in the recognized plurality of interface hubs, and one of these settings is used as the identification information; and
when the identification information cannot be acquired, and a plurality of unlogged interfaces of which an interface setting other than the identification information satisfies a particular condition are present, the recognition step determines those plural interface hubs are in the same group, and coordinates operation of the plurality of devices connected to the interfaces of the same group.

11. The control method of a host device described in claim 10, wherein:
the interface setting other than the identification information includes a vendor identification ("ID") and a product ID; and
the recognition step limits a discovery range of the interfaces to which the plurality of devices connect based on the vendor ID and product ID.

* * * * *